United States Patent
Poirot-Crouvezier et al.

(10) Patent No.: US 11,843,137 B2
(45) Date of Patent: Dec. 12, 2023

(54) GAS-DIFFUSING DEVICE FOR DECREASING HEAD LOSSES

(71) Applicant: Commissariat a l'energie atomique et aux energies alternatives, Paris (FR)

(72) Inventors: Jean-Philippe Poirot-Crouvezier, Grenoble (FR); Ludovic Rouillon, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 202 days.

(21) Appl. No.: 16/912,915

(22) Filed: Jun. 26, 2020

(65) Prior Publication Data

US 2021/0005903 A1 Jan. 7, 2021

(30) Foreign Application Priority Data

Jul. 1, 2019 (FR) ..................... 19 07259

(51) Int. Cl.
*H01M 8/0245* (2016.01)
*H01M 8/1004* (2016.01)

(52) U.S. Cl.
CPC ....... *H01M 8/0245* (2013.01); *H01M 8/1004* (2013.01)

(58) Field of Classification Search
CPC ............. H01M 8/0245; H01M 8/1004; H01M 8/0213; H01M 8/0221; H01M 8/0226; H01M 8/0228; H01M 2008/1095; H01M 8/0239; H01M 8/0243; H01M 8/0258; H01M 4/8807; H01M 4/8605; H01M 4/8657; H01M 8/0247; Y02E 60/50; Y02P 70/50
See application file for complete search history.

(56) References Cited

U.S. PATENT DOCUMENTS

| | | | |
|---|---|---|---|
| 2004/0058123 A1* | 3/2004 | Cooper | H01M 4/8605 428/105 |
| 2005/0255365 A1 | 11/2005 | Ikezoe | |
| 2007/0128464 A1 | 6/2007 | Jang | |
| 2009/0053583 A1* | 2/2009 | Binder | H01M 8/1004 204/290.01 |
| 2010/0279196 A1* | 11/2010 | Kim | H01M 8/1004 429/483 |
| 2011/0244358 A1 | 10/2011 | Yamauchi et al. | |
| 2014/0272664 A1* | 9/2014 | Lu | H01M 8/0234 429/529 |
| 2017/0179498 A1 | 6/2017 | Shoji et al. | |
| 2019/0379064 A1* | 12/2019 | Kawashima | H01M 4/8626 |

FOREIGN PATENT DOCUMENTS

WO  WO 2018/111968 A1  6/2018

OTHER PUBLICATIONS

French Search Report dated Mar. 20, 2020 in French Patent Application No. 1907259, 8 pages.

* cited by examiner

*Primary Examiner* — Muhammad S Siddiquee
(74) *Attorney, Agent, or Firm* — Oblon, McClelland, Maier & Neustadt, L.L.P.

(57) ABSTRACT

A gas-diffusing device, including a superposition of a layer of composite material including electrically conductive fibres and a polymerized resin coating said conductive fibres; a first electrically conductive layer having an open porosity between first and second faces and including a first void in the second face, the first face making electrical contact with the conductive fibres of the layer of composite material, the polymerized resin coating one portion of the first conductive layer on the first face.

13 Claims, 10 Drawing Sheets

[Fig. 1]
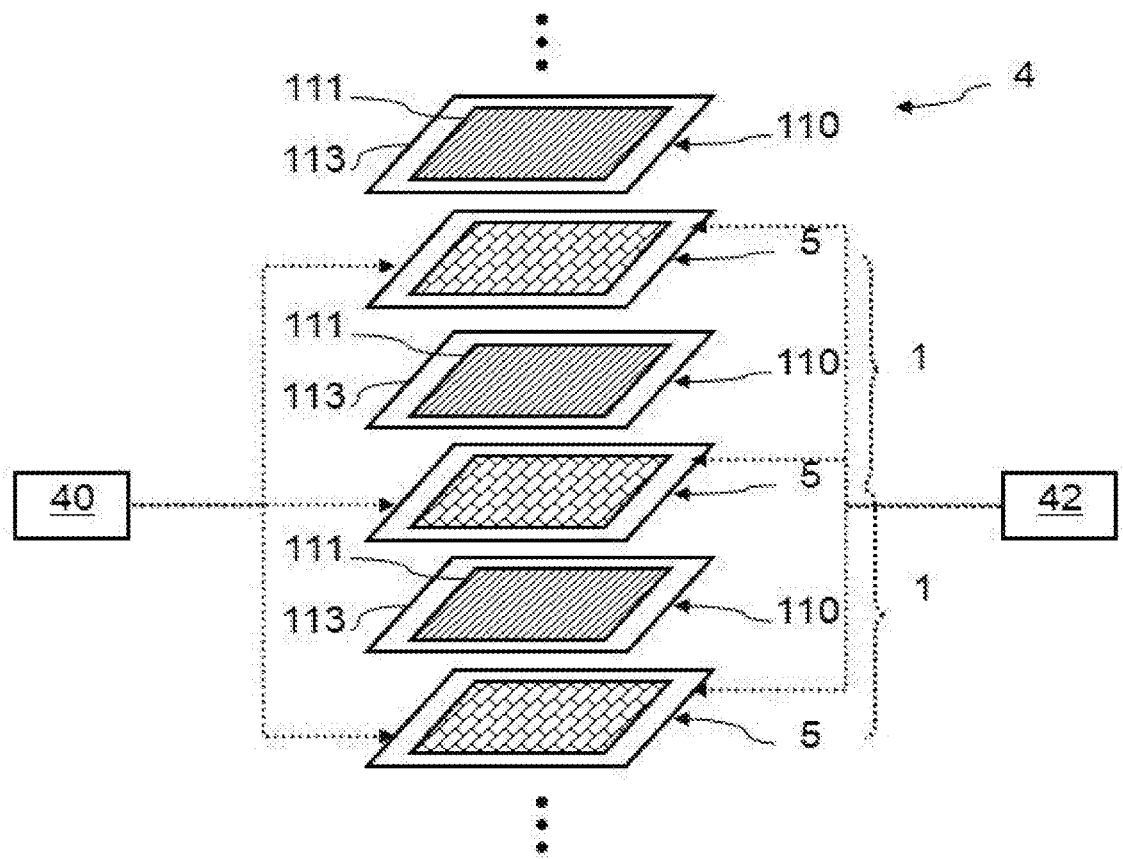
[Fig. 2]
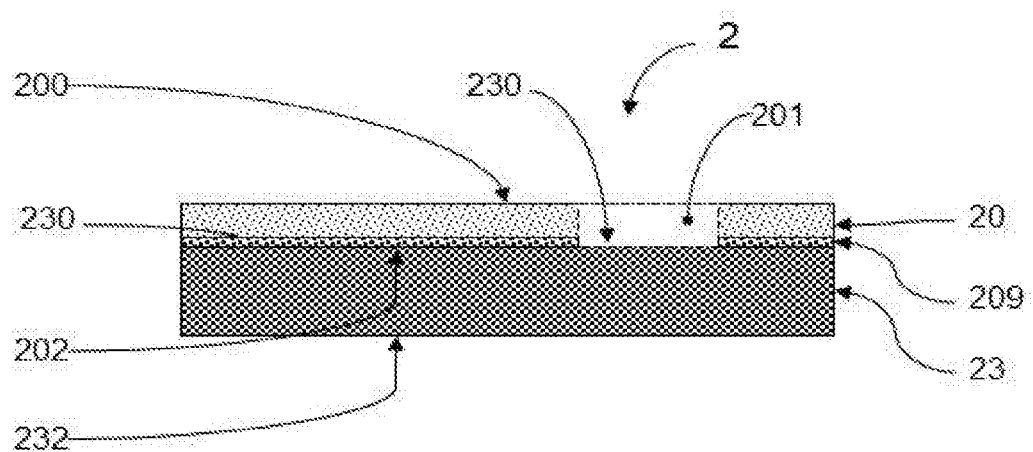

[Fig. 3]
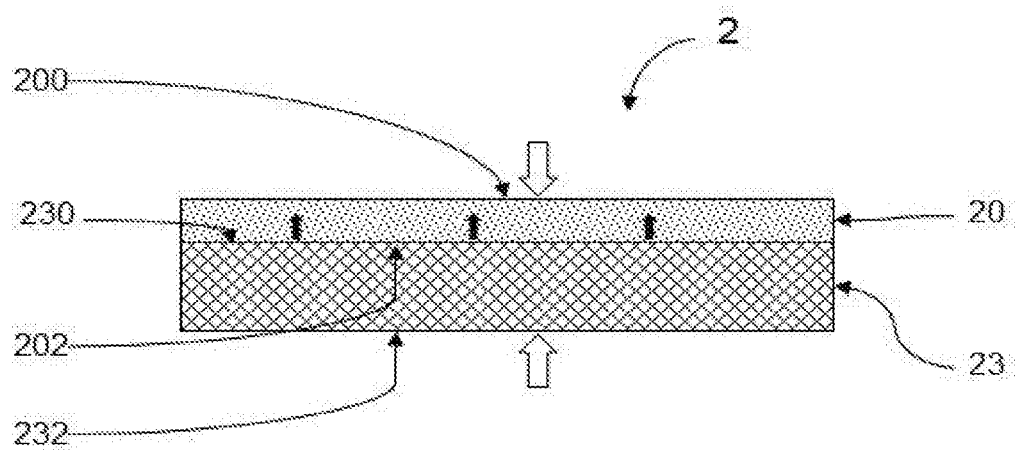
[Fig. 4]
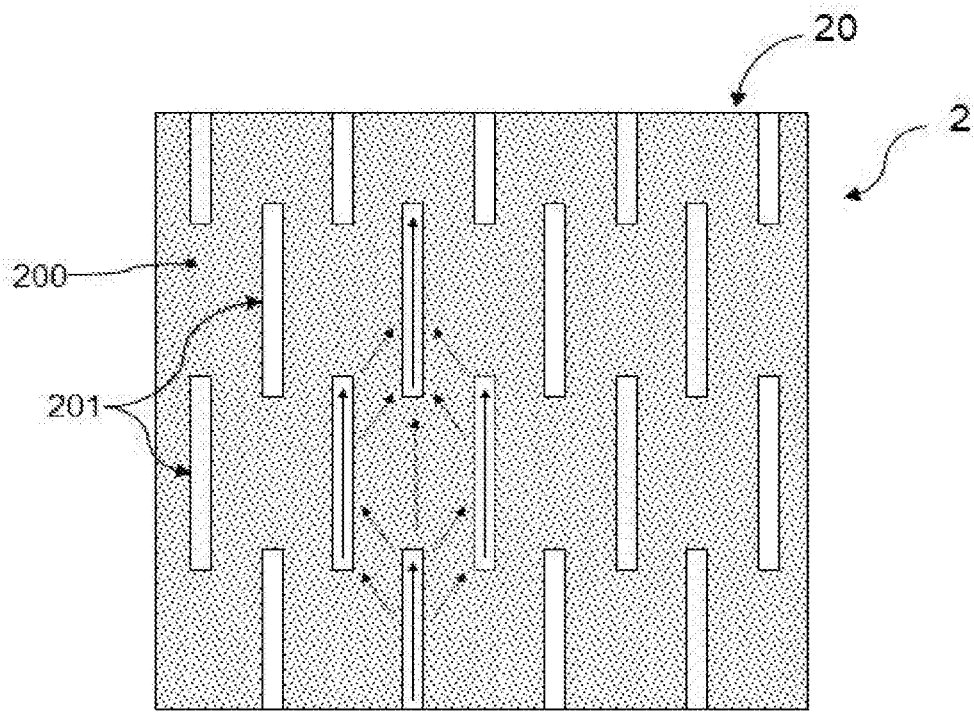

[Fig. 5]
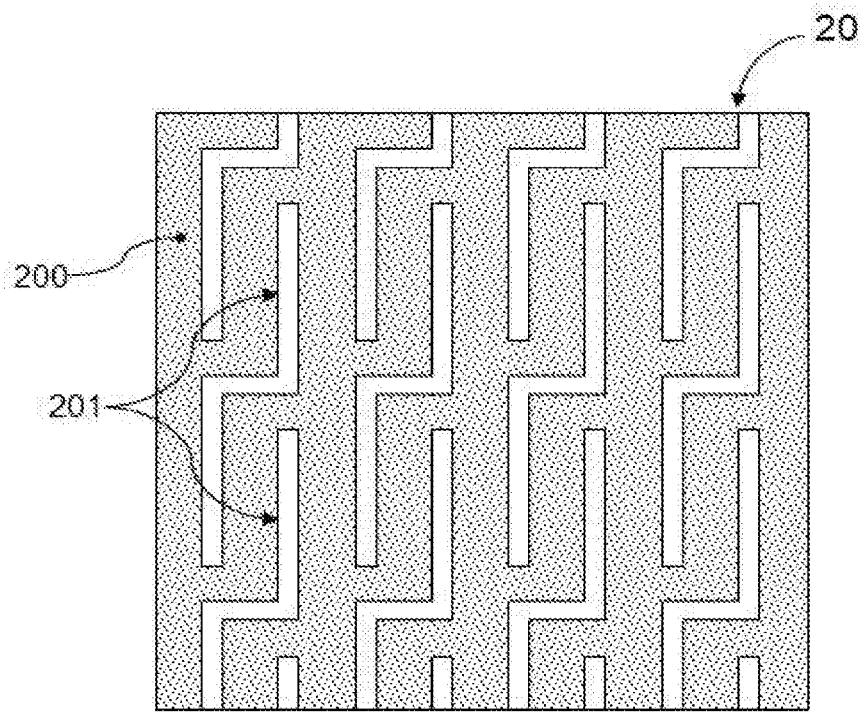
[Fig. 6]
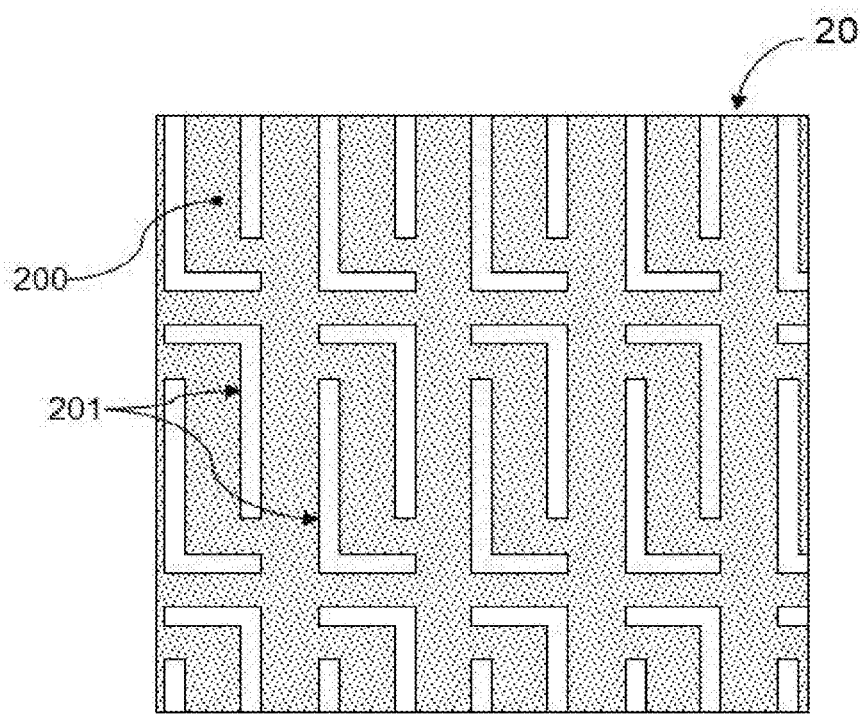

[Fig. 7]
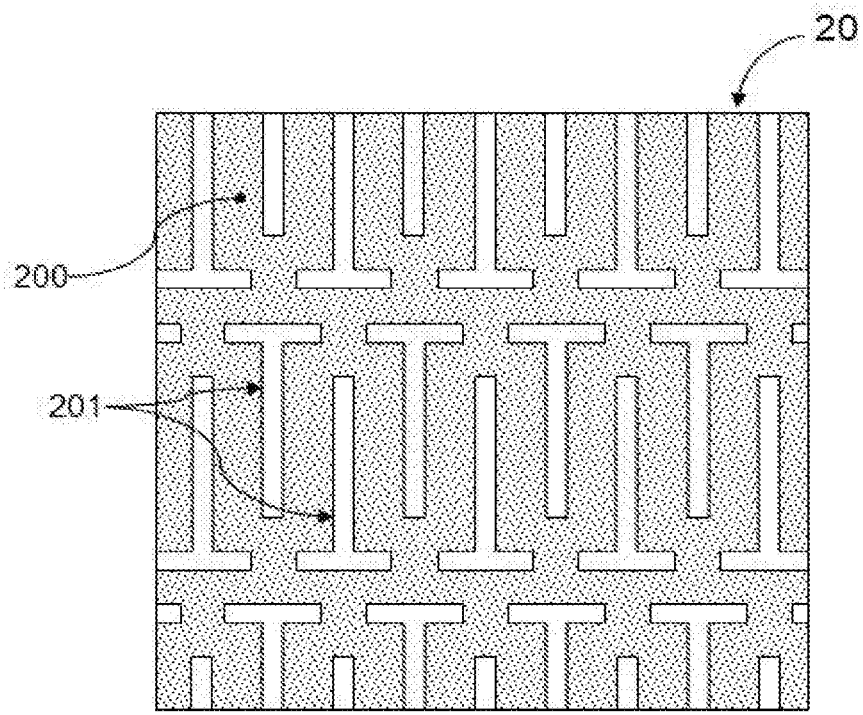
[Fig. 8]
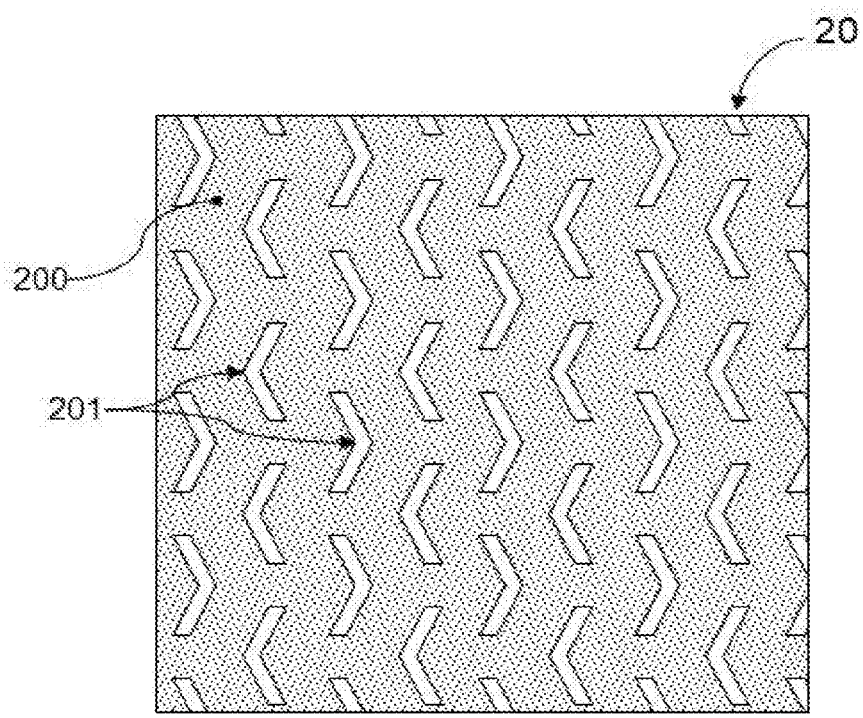

[Fig. 9]
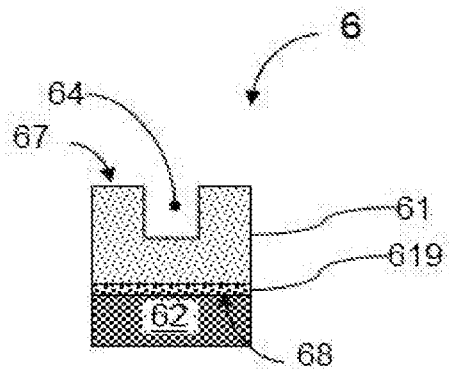
[Fig. 10]
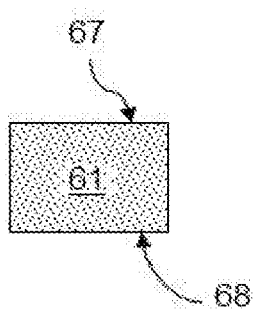
[Fig. 11]
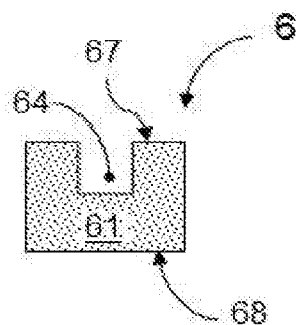

[Fig. 12]
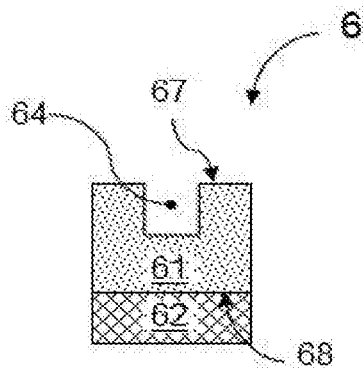
[Fig. 13]
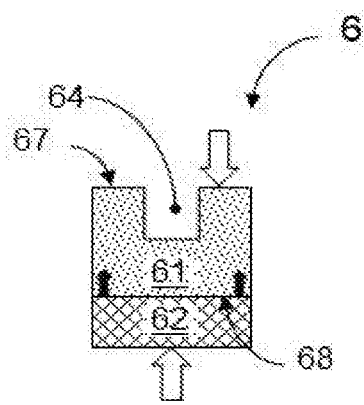
[Fig. 14]
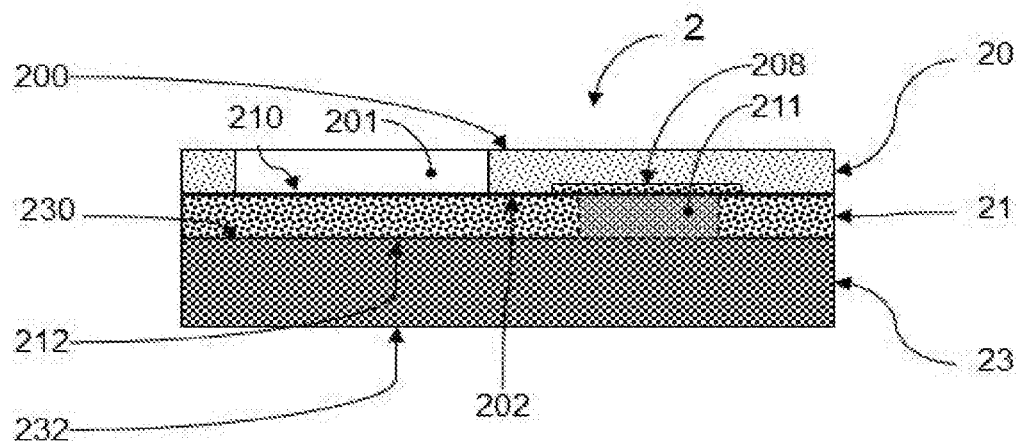

[Fig. 15]
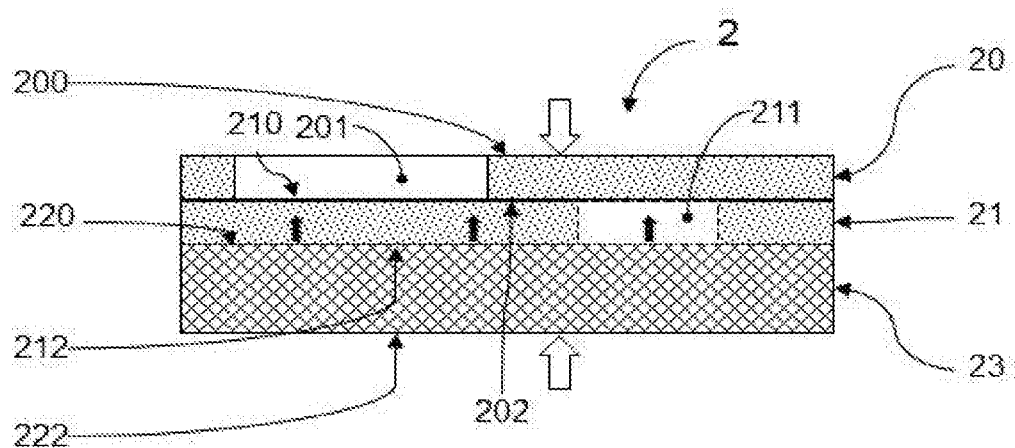
[Fig. 16]
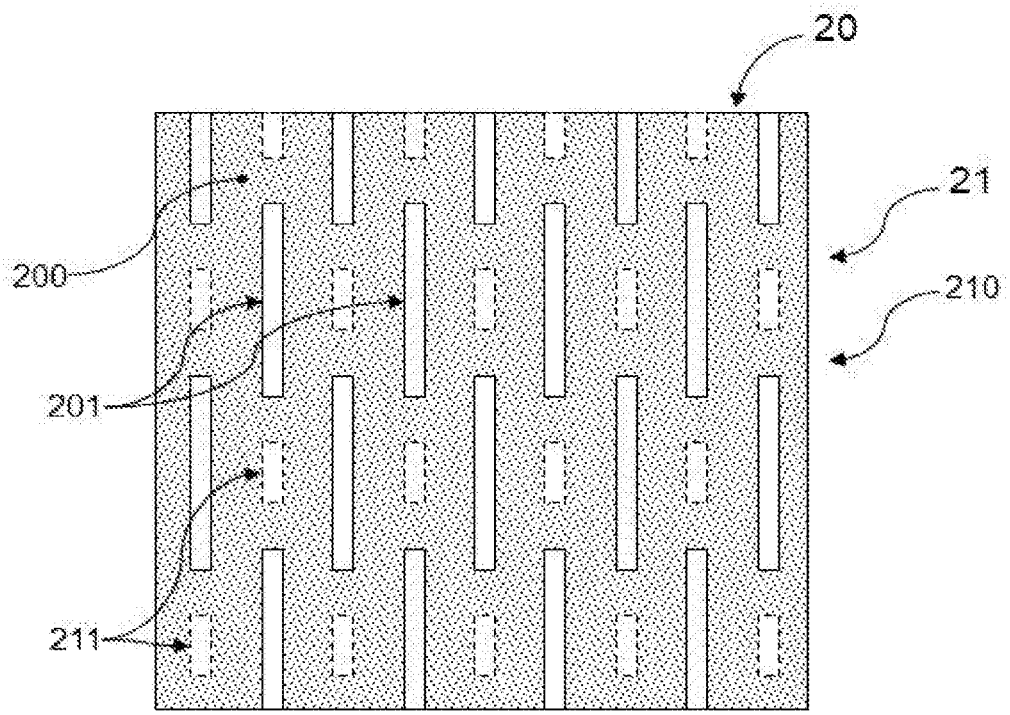

[Fig. 17]
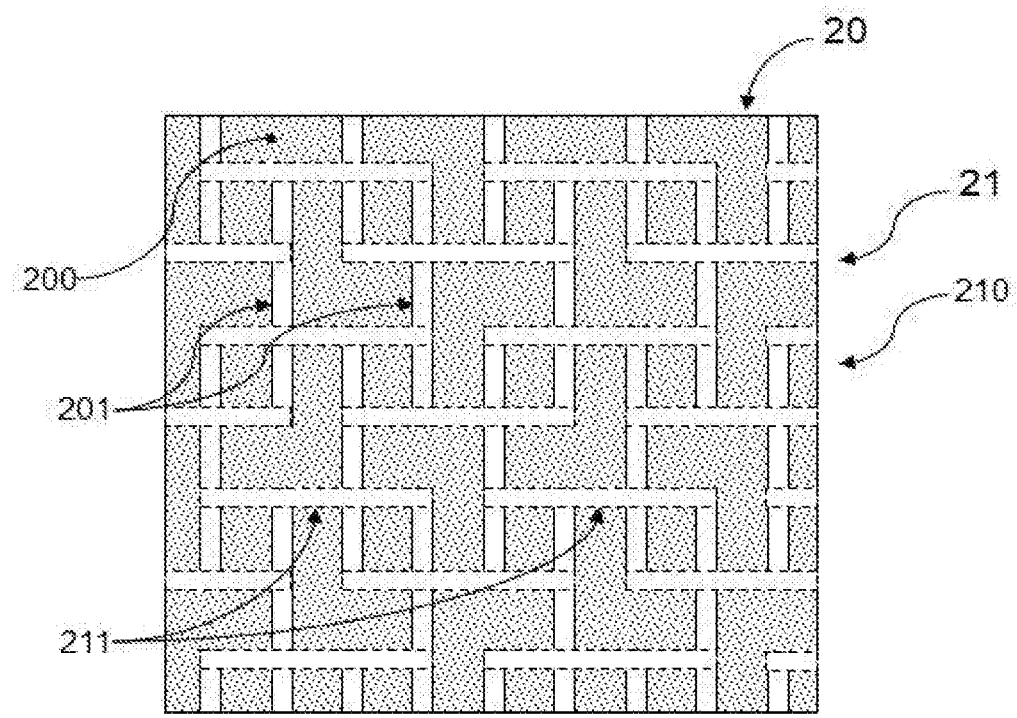
[Fig. 18]
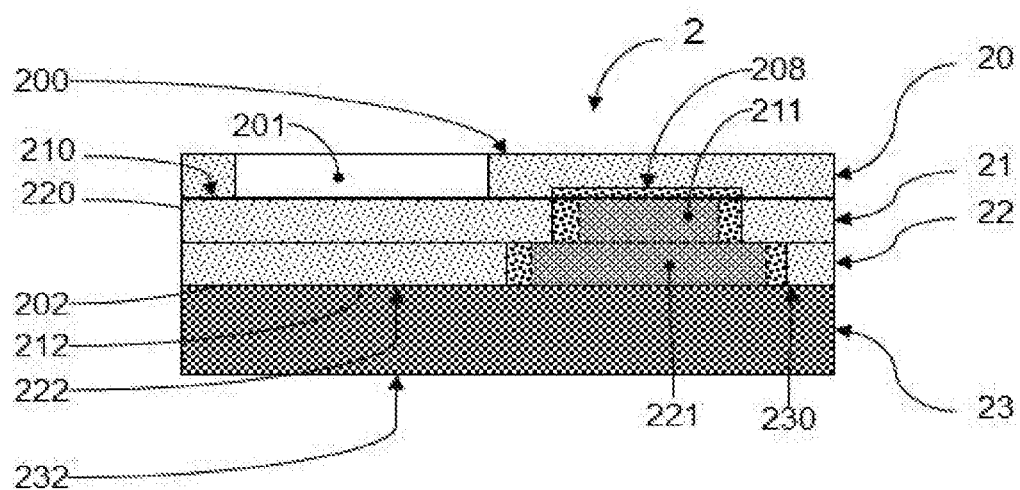

[Fig. 19]
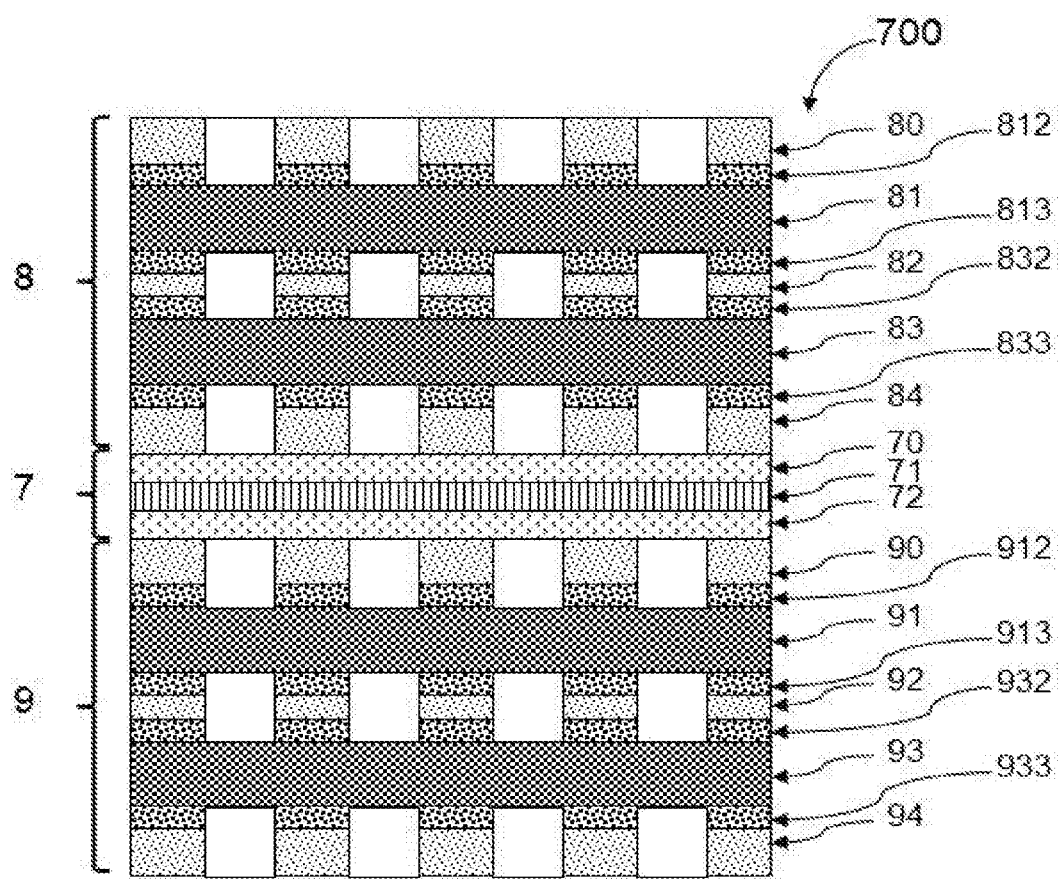

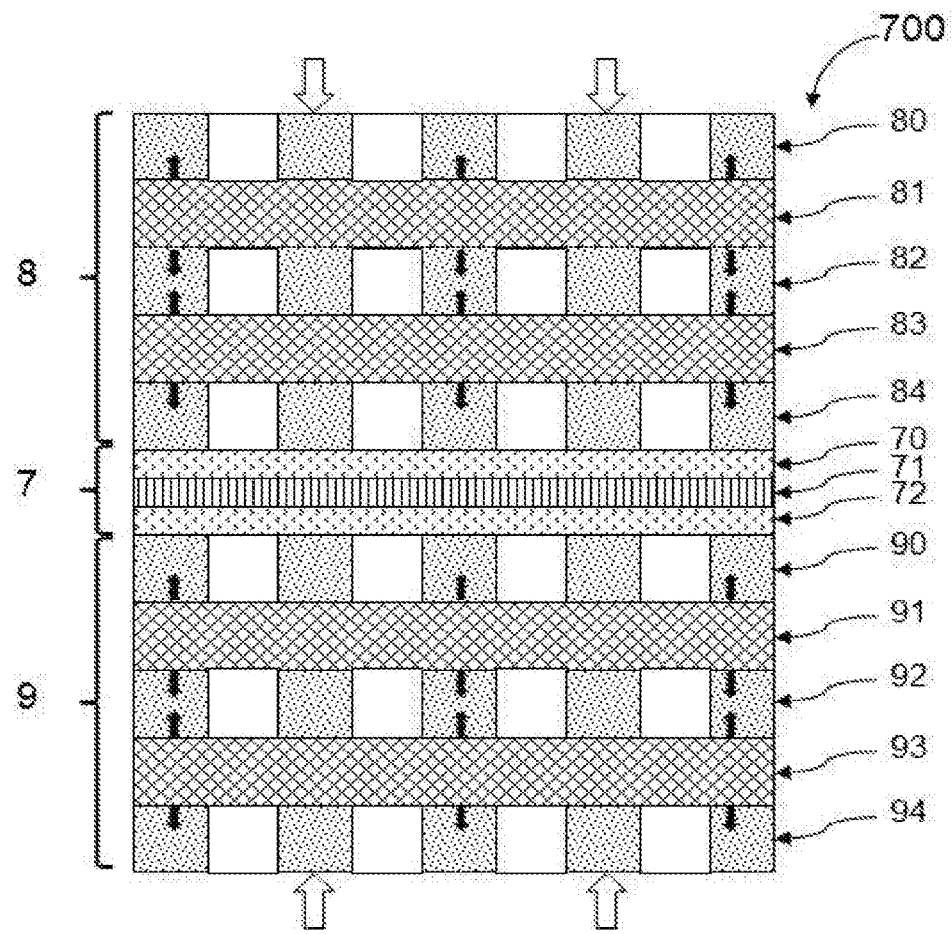
[Fig. 20]

GAS-DIFFUSING DEVICE FOR DECREASING HEAD LOSSES

The invention relates to the manufacture of electrochemical reactors, and in particular to the manufacture of gas-diffusing devices for electrochemical reactors.

Among electrochemical reactors, fuel-cell stacks are undergoing substantial development. Fuel-cell stacks are notably envisaged as power sources for future mass-produced motor vehicles, or as auxiliary power sources in aeronautics. A fuel-cell stack is an electrochemical device that converts chemical energy directly into electrical energy. A fuel-cell stack comprises a stack of a plurality of cells in series. Each cell typically generates a voltage of about 1 volt, and stacking them allows a supply voltage of a higher level, for example of about one hundred volts, to be generated.

Among known types of fuel-cell stacks, mention may notably be made of low-temperature, proton-exchange membrane (PEM) fuel-cell stacks. Such fuel-cell stacks have particularly advantageous properties as regards compactness. Each cell comprises an electrolytic membrane only allowing the passage of protons and not the passage of electrons. The membrane comprises an anode on a first face and a cathode on a second face in order to form a membrane electrode assembly (MEA).

At the anode, the dihydrogen used as fuel is oxidized to produce the protons that pass through the membrane. The membrane thus forms an ionic conductor. The electrons produced by this reaction migrate toward a flow plate, then pass through an electrical circuit external to the cell to form an electrical current. At the cathode, oxygen is reduced and reacts with the protons to form water.

The fuel-cell stack may comprise a plurality of so-called bipolar plates stacked on top of one another, these plates for example being made of metal. The membrane is placed between two bipolar plates.

The bipolar plates are electrically conductive with a view to collecting the electrons generated at the anode. The bipolar plates also play the role of seal-tight separators, separating the anodic flow and cathodic flow. The bipolar plates also play a mechanical role transmitting the forces used to clamp the stack, this being essential to the quality of the electrical contact. Electronic conduction occurs through the bipolar plates, ionic conduction being obtained through the membrane.

According to one design, the flow of the reagents is guided by flow channels in stamped metal sheets that are welded to form the bipolar plates. Metal sheets have good mechanical properties and form effective barriers with regard to limiting the diffusion of dihydrogen. However, metal sheets have a low corrosion resistance. In addition, degradation thereof may form cations that pollute the membrane and decreases the performance and lifetime of the fuel-cell stack. In order to decrease these problems, the surfaces of the metal sheets are frequently treated. However, surface treatments do not improve corrosion resistance sufficiently for certain applications and engender a non-negligible extra cost. Moreover, bipolar plates with this design, i.e. having flow channels defined by stamping, have the drawback that the dimensions of the channels are constrained by the stamping process. Minimum dimensions must thus be respected as to the width of the flow channels or as to the width of the ribs separating flow channels. The uniformity of the current density in the fuel-cell stack is therefore not optimal.

One of the brakes on the uptake of fuel-cell technology is the cost of manufacturing and assembling the various components of fuel-cell stacks. The manufacture of bipolar plates with this design notably represents most of the cost of a fuel-cell stack.

According to another design, the bipolar plate is smooth and the flow and spread of the reagents are achieved via gas diffusion layers interposed between the bipolar plates and the membrane electrode assembly. Reaction products and unreactive species are evacuated by entrainment by the flow to the place where they exit the gas diffusion layers. The gas diffusion layers take the form of porous layers with an open porosity, for example layers of felt or of carbon fabrics.

The gas diffusion layers must have a sufficient thickness to decrease head losses of the reagent flow, this increasing the bulk of the fuel-cell stack. In addition, these bipolar plates are relatively heavy for certain applications. Furthermore, it turns out to be desirable to fasten a gas diffusion layer to the bipolar plate. Moreover, the electrical contact resistance between a gas diffusion layer and a bipolar plate remains relatively high.

The invention aims to solve one or more of these drawbacks. The invention thus relates to a gas-diffusing device, such as defined in the appended claims.

The invention also relates to the variants of the dependent claims. Those skilled in the art will understand that each of the features of the description or of the dependent claims may be combined independently with the features of an independent claim, without however constituting an intermediate generalization.

The invention also relates to a process for manufacturing a gas-diffusing device, such as defined in the dependent claims.

Other features and advantages of the invention will become more clearly apparent from the description that is given thereof below, by way of completely non-limiting indication, with reference to the appended drawings, in which:

FIG. 1 is an exploded perspective view of an example of a stack of membrane electrode assemblies and of bipolar plates for a fuel-cell stack;

FIG. 2 is a cross-sectional view of a gas-diffusing device according to one illustrative example;

FIG. 3 is a cross-sectional view of a gas-diffusing device comprising a void-containing and electrically conductive porous layer according to one illustrative example, the steps of the manufacturing process of which are described in detail;

FIG. 4 is a partial view from above of the gas-diffusing device comprising a void-containing and electrically conductive porous layer of the illustrative example;

FIG. 5 is a partial view from above of a void-containing and electrically conductive porous layer according to one variant of the illustrative example;

FIG. 6 is a partial view from above of a void-containing and electrically conductive porous layer according to another variant of the illustrative example;

FIG. 7 is a partial view from above of a void-containing and electrically conductive porous layer according to another variant of the illustrative example;

FIG. 8 is a partial view from above of a void-containing and electrically conductive porous layer according to another variant of the illustrative example;

FIG. 9 is a cross-sectional view of a gas-diffusing device according to another illustrative example;

FIG. 10 is a cross-sectional view of an electrically conductive porous layer;

FIG. 11 is a cross-sectional view of an electrically conductive porous layer;

FIG. 12 is a cross-sectional view of a gas-diffusing device comprising a void-containing layer according to another illustrative example;

FIG. 13 is a cross-sectional view of a gas-diffusing device comprising a void-containing layer according to another illustrative example, the steps of the manufacturing process of which are described in detail;

FIG. 14 is a cross-sectional view of a gas-diffusing device according to one embodiment of the invention;

FIG. 15 is a cross-sectional view of a gas-diffusing device comprising two void-containing and electrically conductive porous layers according to one embodiment of the invention, the various steps of the manufacturing process of which are described in detail;

FIG. 16 is a partial view from above of the gas-diffusing device comprising two porous layers of FIG. 14;

FIG. 17 is a partial view from above of a gas-diffusing device according to one variant of the third embodiment;

FIG. 18 is a cross-sectional view of a gas-diffusing device comprising three void-containing and electrically conductive porous layers according to another embodiment of the invention;

FIG. 19 is a partial cross-sectional view of an electrochemical system including gas-diffusing devices according to the invention; and FIG. 20 is a partial cross-sectional view of an electrochemical system including gas-diffusing devices according to the invention at the end and during the manufacturing process thereof.

FIG. 1 is a schematic exploded perspective view of a stack of cells 1 of a fuel-cell stack 4. The fuel-cell stack 4 comprises a plurality of superposed cells 1. The cells 1 are proton-exchange-membrane or polymer-electrolyte-membrane cells.

The fuel-cell stack 4 comprises a fuel source 40. The fuel source 40 here supplies dihydrogen to an inlet of each cell 1. The fuel-cell stack 4 also comprises an oxidant source 42. The oxidant source 42 here supplies air to an inlet of each cell 1, the oxygen of the air being used as oxidant. Each cell 1 also comprises exhaust channels. On or more cells 1 also have a cooling circuit.

Each cell 1 comprises one membrane electrode assembly 110 or MEA 110. A membrane electrode assembly 110 comprises an electrolyte 113, a cathode (not illustrated) and an anode 111, the cathode and anode being placed on either side of the electrolyte and fastened to this electrolyte 113. The electrolyte layer 113 forms a semi-permeable membrane that allows protonic conduction while being impermeable to the gases present in the cell. The electrolyte layer also prevents passage of electrons between the anode 111 and cathode.

Between each pair of adjacent MEAs, a bipolar plate 5 is placed. Each bipolar plate 5 defines anodic flow channels and cathodic flow channels on opposite external faces. Some bipolar plates 5 advantageously also define flow channels for coolant between two successive membrane electrode assemblies.

As known per se, during the operation of the fuel-cell stack 4, air flows between an MEA and one bipolar plate, and dihydrogen flows between this MEA and another bipolar plate. At the anode, the dihydrogen is oxidized to produce protons that pass through the MEA. At the cathode, oxygen is reduced and reacts with the protons to form water. The electrons produced by the oxidation of hydrogen are collected by a bipolar plate 5. The electrons produced are then applied to an electrical load connected to the fuel-cell stack 1 to form an electric current. During its operation, one cell of the fuel-cell stack usually generates a DC voltage between the anode and cathode of about 1 V.

The stack may also comprise peripheral seals and membrane reinforcements (not illustrated here). Each cell 1 may furthermore comprise one gas-diffusion layer (not illustrated) placed between the anode and one bipolar plate, and another gas diffusion layer placed between the cathode and another bipolar plate.

Layers of composite materials are frequently sold in the form of fibres pre-impregnated with polymerizable resin. These layers of composite materials are frequently distributed in the form or rolls or reels. Reinforcing fibres such as carbon fibres are electrically conductive.

Layers of composite materials using pre-impregnated fibres have the advantage of being easily deformable for shaping before the polymerization of the resin. The polymerization of the resin then makes these layers very rigid. The invention aims to take advantage of a certain number of properties of such pre-impregnated fibres in the formation of gas-diffusing devices able, for example, to be associated with bipolar plates.

The invention provides a gas-diffusing device. The invention provides a superposition of a layer of composite material, including electrically conductive fibres and a polymerized resin impregnating these fibres, with an electrically conductive layer having an open porosity between first and second opposite faces. A void is produced in the second face, the first face making electrical contact with the conductive fibres of the layer of composite material, the polymerized resin coating one portion of the conductive layer on this first face.

Thus, a mechanical bond between the layer of composite material and the electrically conductive layer is ensured, an optimal electrical connection between the electrically conductive layer and the layer of composite material is ensured, and head losses in the flow in the plane of the electrically conductive layer are decreased because this flow may also occur through the void. Furthermore, the gas-diffusing device thus formed benefits from the rigidity of the composite material.

FIG. 2 is a partial cross-sectional view of a gas-diffusing device 2, according to one illustrative example. The device 2 includes an electrically conductive layer 20 of open porosity. The porosity of the layer 20 is open. The layer 20 moreover has:
  a lower face 202;
  a void 201 produced in an upper face 200 of the layer 20. The void 201 is here a through-void between the faces 200 and 202;
  a region 209 of thickness smaller than the total thickness of the layer 20, the lower face of which is the face 202, containing a polymerized resin. The porous layer 20 advantageously has a thickness smaller than 0.5 mm.

The device 2 also includes a layer of composite material 23 including electrically conductive fibres, which are advantageously made of carbon; the layer 23 has an upper face 230 and a lower face 232. A polymerized resin coats the fibres. The polymerized resin is, for example, a phenolic resin. Such a polymerized resin is impermeable to hydrogen, which may be one of the reagents required to pass through the device 2. The resin being polymerized, the layer 23 forms a rigid composite layer. The composite layer 23 is electrically conductive in its thickness.

The device 2 is rigid, conductive and of integral construction. The device 2 includes a superposition of the elements described above:

the porous layer 20 is located at an external end of the stack, having an open void 201;

the layer made of composite material 23 is located at an opposite external end of the stack, the faces 202 and 230 making contact.

To obtain the superposition, an electrically conductive layer 20 of open porosity is superposed with a layer of composite material 23 including conductive fibres coated with a polymerizable resin (for example taking the form of pre-impregnated fibres). Next, a uniform pressure is applied to this superposition (illustrated by the white block arrows) in a direction perpendicular to the faces 200 and 232, as illustrated in FIG. 3. The applied pressure is advantageously comprised between 0.5 and 1.5 MPa. This compression allows the electrical interconnection of the fibres to be ensured via penetration of these fibres into the face 202 of the layer 20, thus guaranteeing both a mechanical and an electrical contact between these fibres and the layer 20.

The compression also allows a flow (illustrated by the black block arrows) of the polymerizable resin contained in the layer 23, towards the porous layer 20 in a direction parallel to the direction of the exerted pressure. The resin flowing vertically from the layer 23 to the layer 20 advantageously does not impregnate the entire volume of the layer 20. The resin flowing vertically from the layer 23 into the layer 20 here passes through the face 202 without however reaching the opposite external face 200 of the layer 20. The layer 20 may thus still participate in the flow of fluid through its open porosity, in all the regions not impregnated with resin.

Provision may for example be made for the volume of the layer 20 to be larger than that of the layer 23. Thus, the layer 23 will then not contain a sufficient amount of resin for it to be able to flow and impregnate the entire volume of the conductive porous layer.

The compression of the superposition is maintained and the resin, after it has flowed, is polymerized. The layer 23 initially containing the polymerizable resin forms a solidified electrically conductive composite layer. The excess of resin having flowed from the layer 23 to the layer 20 through the face 202 forms the electrically conductive layer 209, solidified by the polymerized resin after the flow thereof. The layer 20 preserves its open porosity at the upper external end of the device 2. In particular, the resin does not reach the face 200 of the layer 20.

Next, the void 201 is produced in face 200 of the layer 20, in a direction perpendicular to the plane of the cross section shown. This step of forming the void 201 may for example be carried out by mechanical machining. The void 201 is advantageously a through-void between the faces 200 and 202. In the illustrated example, a plurality of voids 201 are produced in the layer 20, in a way distributed over its surface. The voids 201 may also be produced in the layer 20 prior to its superposition with the layer 23.

FIG. 4 shows a partial view from above of a variant of the gas-diffusing layer 2 described above. Voids 201 are produced in the face 200 of the layer 20. The voids 201 each have a closed outline. Reagent is thus forced to flow through the open porosity of the layer 20, to avoid excessively large disparities in head losses in the flow of reagent through this layer 20. The voids 201 are advantageously through-voids between the upper external face 200 and lower external face (not shown) of the layer 20, in order to allow a large cross section of reagent flow to be obtained. The voids 201 are advantageously separate and for example take the form of parallel rectilinear grooves, of constant length. The grooves may advantageously be obtained by a machining process or by laser ablation or even by any other cutting process. Laser ablation notably allows shells to be formed to avoid subsequent untimely flow of resin. The grooves thus form discontinuous flow channels. The discontinuous channels also allow the layer to preserve a sufficient rigidity 20, in particular if these grooves are produced before the assembly of the layers 20 and 23. The dispersion of the dimensions of the grooves may also be narrow. The width of the grooves is thus typically smaller than 0.4 mm, and advantageously smaller than 0.2 mm.

The fluids flow in part through the formed voids 201 (as shown by the straight arrows of solid line in FIG. 4) and in part through the material of the porous layer 20 (as shown by the straight arrows of dashed line in FIG. 4). The layer 20 is for example made of foam, felt or fabric.

FIG. 5 shows a partial view from above of an upper external face 200 of an electrically conductive porous layer 20, containing voids 201 according to another variant of the illustrative example. The voids 201 each have a closed outline and may for example be through-voids between the upper external face 200 and the lower external face (not shown) of the layer 20.

In this variant, the voids 201 advantageously have a Z shape, the angles of the Z summing to 90°. The voids 201 thus formed are for example aligned with one another on the surface 200 on the one hand in longitudinal direction and on the other hand in transverse direction.

FIG. 6 shows a partial view from above of an upper external face 200 of an electrically conductive porous layer 20, containing voids 201 according to another variant of the illustrative example. The voids 201 each have a closed outline and may for example be through-voids between the upper external face 200 and the lower external face (not shown) of the layer 20.

In this variant, the voids 201 advantageously have an L shape. The voids 201 thus formed are for example grouped in pairs with an axis of symmetry therebetween. The various pairs are advantageously aligned with one another on the surface 200 on the one hand in the longitudinal direction and on the other hand in the transverse direction.

FIG. 7 shows a partial view from above of an upper external face 200 of an electrically conductive porous layer 20, containing voids 201 according to another variant. The voids 201 each have a closed outline and may for example be through-voids between the upper external face 200 and the lower external face (not shown) of the layer 20.

In this variant, the voids 201 advantageously have a T shape. The voids 201 thus formed are for example grouped in pairs with an axis of symmetry therebetween. The various pairs are advantageously aligned with one another on the surface 200 on the one hand in the longitudinal direction and on the other hand in the transverse direction.

FIG. 8 shows a partial view from above of an upper external face 200 of an electrically conductive porous layer 20, containing voids 201 according to another variant of the illustrative example. The voids 201 each have a closed outline and may for example be through-voids between the upper external face 200 and the lower external face (not shown) of the layer 2.

In this variant, the voids 201 advantageously have a chevron shape. The voids 201 thus formed are here aligned longitudinally in rows, two adjacent rows being offset longitudinally.

FIG. 9 is a partial cross-sectional view of a gas-diffusing device 6 according to another illustrative example. The device 6 includes an electrically conductive porous layer 61 having:

a lower face 68;

a void 64 produced in an upper face 67;

a region 619 of thickness smaller than the total thickness of the layer 61 and advantageously not reaching the surface of the void 64. The lower face of the region 619 is the face 68, containing a polymerized resin.

The porous layer 61 advantageously has a thickness smaller than 0.5 mm.

The device 6 also includes a layer of composite material 62 formed from electrically conductive fibres. The resin and the fibres may be of the same type as described for the first illustrative example. The resin being polymerized, the layer 62 forms a rigid composite layer. The composite layer 62 is electrically conductive in its thickness.

The device 6 is rigid, conductive and of integral construction. The device 6 is formed from a superposition of the elements described above:

the porous layer 61 is located at an external end of the stack, having a free void 64;

the composite layer 62 is located at an opposite external end of the stack.

To obtain the superposition, an electrically conductive porous layer 61, a cross-sectional view of which is shown in FIG. 10, may be provided beforehand. The layer 61 has an open porosity between a face 67 and a face 68.

The configuration shown in FIG. 11 is obtained by forming a void 64 in the external face 67 of the element 61. This step of forming the void 64 may for example be carried out by mechanical machining.

Next, a layer of composite material 62 is positioned in contact with the face 68 of the layer 61, and therefore opposite the void 64. The layer 62 includes electrically conductive fibres; a polymerizable resin (not shown) impregnates the fibres. The configuration shown in FIG. 12 is obtained, with superposition of the layers 61 and 62.

As illustrated in FIG. 13, a uniform pressure (illustrated by the white block arrows) is applied in a direction perpendicular to the surfaces 67 and 68 of the layer 61. This compression allows the electrical interconnection of the fibres to be ensured via penetration of these fibres into the surface 68 of the layer 61, thus guaranteeing both a mechanical and an electrical contact between these fibres and the layer 61. The compression also allows a flow (illustrated by the black block arrows) of the resin contained in the layer 62 towards the porous layer 61, in a direction parallel to the direction of the exerted pressure. The resin flowing vertically from the layer 62 to the layer 61 does not impregnate the entire volume of the layer 61. Provision may for example be made for the volume of the layer 61 to be larger than that of the layer 62. Specifically, the layer 62 will then not contain a sufficient amount of resin for it to be able to flow and impregnate the entire volume of the layer 61. The resin flowing vertically from the layer 62 to the layer 61 here passes through the face 68 without however reaching the opposite external face 67 of the layer 61. Advantageously, the void 64 does not fill with resin, this then allowing reagent to flow through this void 64. The compression of the superposition is maintained and the resin is polymerized after the flow thereof.

FIG. 14 shows a partial cross-sectional view of a rigid, conductive, gas-diffusing device of integral construction, according to one embodiment of the invention. The device includes an electrically conductive porous layer 20 containing voids 201 produced in an upper external face 200; the layer 20 also has a lower face 202. The voids 201 are advantageously through-voids between the faces 200 and 202.

The device 2 also includes a layer of composite material 23 having a structure similar to that of the illustrative examples. The layer 23 has an upper face 230 and an opposite lower face 232. A polymerized resin coats the fibres.

The device 2 also includes an electrically conductive layer 21 in its thickness, this layer 21 containing voids 211 produced in a top face 210 thereof. The layer 21 may have the same structure and the same composition as the layer 20. The layer 21 has a lower face 212. The voids 211 are filled with polymerized resin extending as far as to the layer 20. The layer 21 is itself at least partially impregnated with polymerized resin.

In the device 2, faces 202 and 210 make contact. Faces 212 and 230 also make contact. The layer 21 is therefore interposed between the layers 20 and 23. Plumb with the void 211 filled with polymerized resin, the layer 20 advantageously has a region 208 of polymerized and solidified resin. The resin having flowed through the void 211 thus allows a mechanical bond between the layers 20 and 23 to be ensured. Moreover, the void 211 promotes the flow of the polymerizable resin, whereas the material of the layer 21 brakes this flow. Therefore, the resin impregnates only the region 208 of the layer 20, without filling the voids 201. The flow of reagent through the layer 20 is thus promoted, through its open porosity and its voids 201. Advantageously, only one portion of the volume of the layer 21 is impregnated with resin, so that this layer 21 may also be passed through by a flow of reagent.

To obtain the gas-diffusing device 2 of this embodiment, an electrically conductive layer 20 of open porosity with voids 201, an electrically conductive layer 21 of open porosity with voids 211, and a layer of composite material 23 including conductive fibres coated with a polymerizable resin are superposed.

Next, a uniform pressure is applied to this superposition (illustrated by the white block arrows) in a direction perpendicular to the faces 200 of the layer 20 and 232 of the layer 23, as illustrated in FIG. 15. The applied pressure is advantageously comprised between 0.5 and 1.5 MPa. This compression allows the electrical interconnection of the carbon fibres of the layer 23 to be ensured via penetration of these fibres into the face 212 of the layer 21, thus guaranteeing both a mechanical and an electrical contact between these fibres and the layer 23. The compression also allows an electrical interconnection to be ensured via contact of the layer 21 with the layer 20, via faces 210 and 202, respectively.

The compression also allows a flow (illustrated by the black block arrows) of the polymerizable resin contained in the layer 23 towards the porous layers 20 and 21 in a direction parallel to the direction of the exerted pressure. The resin flowing vertically from the layer 23 to the layer 20 through the layer 21 advantageously does not impregnate the entire volume of the layer 20. The resin flowing vertically from the layer 23 into the layer 21 here passes through the face 212 without however reaching the opposite external face 210 of the layer 21. The resin flowing vertically from the layer 21 into the layer 20 here passes through the face 202 without however reaching the opposite external face 200 of the layer 20.

The compression of the superposition is maintained and the resin, after it has flowed, is polymerized. The layer 23 initially containing the polymerizable resin forms a solidified electrically conductive composite layer. The excess of resin having flowed from the layer 23 to the layer 21 forms a solidified layer.

The excess of resin having flowed from the layer 23 into the layer 20 through the layer 21 concentrates at the interface between the layer 20 and the void 211 to form a solidified region 208. Lastly, the layer 20 remains porous at the upper external end of the device 2.

FIG. 16 shows a partial view from above of the upper external face 200 of the electrically conductive porous layer 20, containing voids 201 according to one variant of the embodiment. The voids 201 each have a closed outline and may for example be through-voids between the upper external face 200 and the lower external face (not shown) of the layer 20.

In this variant, the voids 201 are advantageously separate. The grooves thus form discontinuous flow channels. The width of these grooves is thus typically smaller than 0.4 mm, and advantageously smaller than 0.2 mm.

The voids 211 are represented in FIG. 16 in transparency, these voids for example being parallel to the voids 201 described above. The layers 20 and 21 are here placed with respect to one another so that the voids 201 and 211 are not superposed. The resin that flows through the voids 211 thus forms mechanical bonds with the layer 20, without decreasing the flow of reagent through the voids 201.

In another variant illustrated in FIG. 17, the voids 201 and 211 are separate. FIG. 17 shows a partial view from above of an upper external face 200 of an electrically conductive porous layer 20. The voids 201 and 211 each have a closed outline and are through-voids.

The voids 201 and 211 are here partially superposed. It is thus possible to form continuous but winding channels for the flow of the reagents through the layers 20 and 21. The voids 201 and 211 may be elongate in perpendicular directions.

The void configurations described with reference to FIGS. 4 to 9 may also be used.

FIG. 18 shows a partial cross-sectional view of a rigid and conductive gas-diffusing device, according to a second embodiment. The device includes an electrically conductive porous layer 20 containing voids 201 produced in an upper external face 200; the layer 20 also has a lower face 202. The voids 201 are through-voids between the faces 200 and 202.

The device also includes a layer of composite material 23, such as described with reference to the preceding embodiment and with reference to the illustrative examples.

The device also includes layers 21 and 22 interposed between the layers 20 and 23. The layers 21 and 22 may have the same structure and the same composition as the layer 20. The layer 21 is electrically conductive in its thickness and contains voids 211 produced in an upper face 210. The layer 21 also has a lower face 212. The voids 211 are advantageously filled with polymerized resin. The layer 22 is electrically conductive in its thickness and contains voids 221 produced in an upper face 220. The layer 22 also has a lower face 222. The voids 221 are advantageously filled with polymerized resin. The voids 221 are at least partially superposed with the voids 211 described above. The resin having flowed through the voids 211 and 221 thus allows the layers 20 and 23 to be secured to each other.

Plumb with the void 211 filled with polymerized resin, the layer 20 advantageously has a region 208 of polymerized and solidified resin. Outside of this region 208, the layer 20 advantageously comprises no regions containing polymerized resin.

FIG. 19 is a partial cross-sectional view of an electrochemical system 700 able to include gas-diffusing devices according to the invention. The electrochemical system 700 includes:

a gas-diffusing device 8;
a gas-diffusing device 9;
a membrane electrode assembly 7 placed between the devices 8 and 9.

The device 8 is formed from a stack of:
an electrically conductive porous layer 80, including a region 812 impregnated with polymerized and solidified resin;
an electrically conductive porous layer 82, including regions 813 and 832 impregnated with polymerized and solidified resin;
an electrically conductive porous layer 84, including a region 833 impregnated with polymerized and solidified resin;
a layer of composite material 81 placed between the layers 80 and 82;
a layer of composite material 83 placed between the layers 82 and 84.

The layers of composite material 81 and 83 include electrically conductive fibres coated in a polymerized resin.

The gas-diffusing device 8 here forms a bipolar plate in the context of use thereof in a fuel-cell stack.

The device 9 is formed from a stack of:
an electrically conductive porous layer 90, including a region 912 impregnated with polymerized and solidified resin;
an electrically conductive porous layer 92, including regions 913 and 932 impregnated with polymerized and solidified resin;
an electrically conductive porous layer 94, including a region 933 impregnated with polymerized and solidified resin;
a layer of composite material 91 placed between the layers 90 and 92;
a layer of composite material 93 placed between the layers 92 and 94.

The layers of composite material 91 and 93 include electrically conductive fibres coated in a polymerized resin.

The gas-diffusing device 9 here forms a bipolar plate in the context of use thereof in a fuel-cell stack.

The bipolar plates 8 and 9 allow different reagents to flow over their external faces, and allow a coolant to flow through their internal portion.

The membrane electrode assembly 7 is formed from:
an anodic microporous layer 70;
a cathodic microporous layer 72;
a proton-exchange membrane 71 placed between the layers 70 and 72.

The assembly 7 allows the flow of protons between 2 bipolar plates to be ensured in the context of use thereof in a fuel-cell stack.

To obtain this configuration, after a suitable superposition of layers has been formed, a uniform pressure (illustrated by the white block arrows) is applied to this superposition in a direction perpendicular to the external faces, as illustrated in FIG. 20. This compression allows the electrical interconnection of the fibres present at the surface on the faces of the layers 81, 83, 91 and 93 to be ensured via penetration of these fibres into faces of the porous layers 80, 82, 84, 90, 92 and 94, thus guaranteeing both a mechanical and an electrical contact between these fibres and the porous layers.

The compression also allows a vertical flow (illustrated by the black block arrows) of the resin contained in the layer 81 towards the porous layers 80 and 82 in a direction parallel to the direction of the exerted pressure. The resin flowing vertically from the layer 81 to the layers 80 and 82 does not impregnate the entire volume of the layers 80 and 82.

Provision may for example be made for the volume of the layers 80 and 82 to be larger than that of the layer 81. Specifically, the layer 81 will then not contain a sufficient amount of resin for it to be able to flow and impregnate the entire volume of the conductive porous layers 80 and 82.

The compression also allows a vertical flow (illustrated by the black block arrows) of the resin contained in the layer 83 towards the porous layers 82 and 84 in a direction parallel to the direction of the exerted pressure. The resin flowing vertically from the layer 83 to the layers 82 and 84 does not impregnate the entire volume of the layers 82 and 84. Provision may for example be made for the volume of the layers 82 and 84 to be larger than that of the layer 83. Specifically, the layer 83 will then not contain a sufficient amount of resin for it to be able to flow and impregnate the entire volume of the conductive porous layers 82 and 84.

The compression also allows a vertical flow (illustrated by the black block arrows) of the resin contained in the layer 91 towards the porous layers 90 and 92 in a direction parallel to the direction of the exerted pressure. The resin flowing vertically from the layer 91 to the layers 90 and 92 does not impregnate the entire volume of the layers 90 and 92. Provision may for example be made for the volume of the layers 90 and 92 to be larger than that of the layer 91. Specifically, the layer 91 will then not contain a sufficient amount of resin for it to be able to flow and impregnate the entire volume of the conductive porous layers 90 and 92.

The compression lastly allows a flow (illustrated by the black block arrows) of the resin contained in the layer 93 towards the porous layers 92 and 94 in a direction parallel to the direction of the exerted pressure.

The compression is maintained and the resin, after it has flowed, is polymerized. The configuration described above is obtained.

The layer 81 initially containing the polymerizable resin forms a solidified electrically conductive composite layer. The excess of resin having flowed from the layer 81 into the layers 80 and 82 forms regions solidified by the polymerized resin after the flow thereof.

The layer 83 initially containing the polymerizable resin forms a solidified electrically conductive composite layer. The excess of resin having flowed from the layer 83 into the layers 84 and 82 forms regions solidified by the polymerized resin after the flow thereof.

The layer 91 initially containing the polymerizable resin forms a solidified electrically conductive composite layer. The excess of resin having flowed from the layer 91 into the layers 90 and 92 forms regions solidified by the polymerized resin after the flow thereof.

The layer 93 initially containing the polymerizable resin forms a solidified electrically conductive composite layer. The excess of resin having flowed from the layer 93 into the layers 94 and 92 forms regions solidified by the polymerized resin after the flow thereof.

The system may advantageously be used in the context of an assembly intended to form a fuel-cell stack, because it allows both reagent fluids to flow through the gas-diffusing devices from which it is composed, and electrons to be transferred through the membrane electrode assembly.

The invention claimed is:

1. A gas-diffusing device, comprising a superposition of:
   a layer of composite material including electrically conductive fibers and a polymerized resin coating said conductive fibers;
   a first electrically conductive layer having an open porosity between first and second faces and comprising a first void in the second face, the first face making electrical contact with the conductive fibers of the layer of composite material, the polymerized resin coating one portion of the first conductive layer on the first face; and
   a second electrically conductive layer interposed between the first conductive layer and said layer of composite material, said second conductive layer having an open porosity between first and second faces and comprising a first through-void between its first and second faces, said conductive fibers making contact with the first face of the second conductive layer, wherein
   said polymerized resin passes through said first void of the second conductive layer and extends as far as through the first face of the first conductive layer, and
   the layer of composite material is waterproof.

2. The gas-diffusing device according to claim 1, wherein said first void of the first layer has a closed outline.

3. The gas-diffusing device according to claim 1, wherein said first conductive layer has other voids in the second face, these voids being separate.

4. The gas-diffusing device according to claim 1, wherein the first void of the first conductive layer and the first void of the second conductive layer are not superposed.

5. The gas-diffusing device according to claim 4, wherein the second conductive layer comprises a second void superposed at least partially with the first void of the first conductive layer.

6. The gas-diffusing device according to claim 1, wherein said superposition comprises a third electrically conductive layer, having an open porosity between first and second faces, and comprising a first through-void between its first and second faces, the first conductive layer being interposed between the second conductive layer and the third conductive layer, said first layer comprising a second void superposed with the first void of the second layer, said polymerized resin passing through said second void of the first conductive layer extending as far as through the first face of the third conductive layer.

7. The gas-diffusing device according to claim 1, wherein said resin does not reach said second face of the first conductive layer.

8. The gas-diffusing device according to claim 1, wherein said first conductive layer is a layer of foam, of felt or of fabric.

9. The gas-diffusing device according to claim 1, wherein said resin is a phenolic resin.

10. The gas-diffusing device according to claim 1, wherein the first void of the first conductive layer is a through-void.

11. The gas-diffusing device according to claim 1, wherein the first void of the first conductive layer takes the form of a groove of a width smaller than 0.4 mm.

12. The gas-diffusing device according to claim 1, wherein the first conductive layer has a thickness smaller than 0.5 mm.

13. An electrochemical system, comprising:
   the first and second gas-diffusing devices according to claim 1; and
   a membrane electrode assembly including a proton-exchange membrane, said assembly being placed between said first and second gas-diffusing devices.

* * * * *